United States Patent [19]

McJones

[11] 3,709,241
[45] Jan. 9, 1973

[54] FILL LIMITER, CHECK AND SAFETY VALVE

[76] Inventor: Robert W. McJones, 529 Via Del Monte, Palos Verdes Estates, Calif. 90274

[22] Filed: Dec. 11, 1970

[21] Appl. No.: 97,061

[52] U.S. Cl. .................... 137/71, 137/540, 137/557
[51] Int. Cl. ........................................... F16k 17/40
[58] Field of Search .............. 220/89 A, 89 B; 222/3; 137/68–74, 557, 540, 543.14, 543.21; 138/44

[56] References Cited

UNITED STATES PATENTS

| | | | |
|---|---|---|---|
| 2,197,271 | 4/1940 | Kerrick | 137/540 |
| 3,438,391 | 4/1969 | Yocum | 137/540 X |
| 2,861,569 | 11/1958 | Emerson | 137/71 X |
| 1,939,509 | 12/1933 | McClelland | 137/557 X |
| 3,270,768 | 9/1966 | Kamowski | 137/557 X |

Primary Examiner—Martin P. Schwadron
Assistant Examiner—Richard Gerard
Attorney—Christie, Parker & Hale

[57] ABSTRACT

A fill limiter, check and safety valve has a body with an inlet passage for receiving gas from a source, an outlet passage for passing gas to tanks to be charged and a check valve between the two passages which prevents flow from the outlet passage to the inlet passage and, in addition, prevents inlet pressure from exceeding a predetermined level. A safety passage opens into the inlet passage and is capped by a burst disc assembly. A plug or fitting caps the bore in which the valving element is disposed and is adapted to lead to a gauge. The fitting has an orifice to prevent pressure surges from affecting gauge readings.

3 Claims, 1 Drawing Figure

PATENTED JAN 9 1973
3,709,241
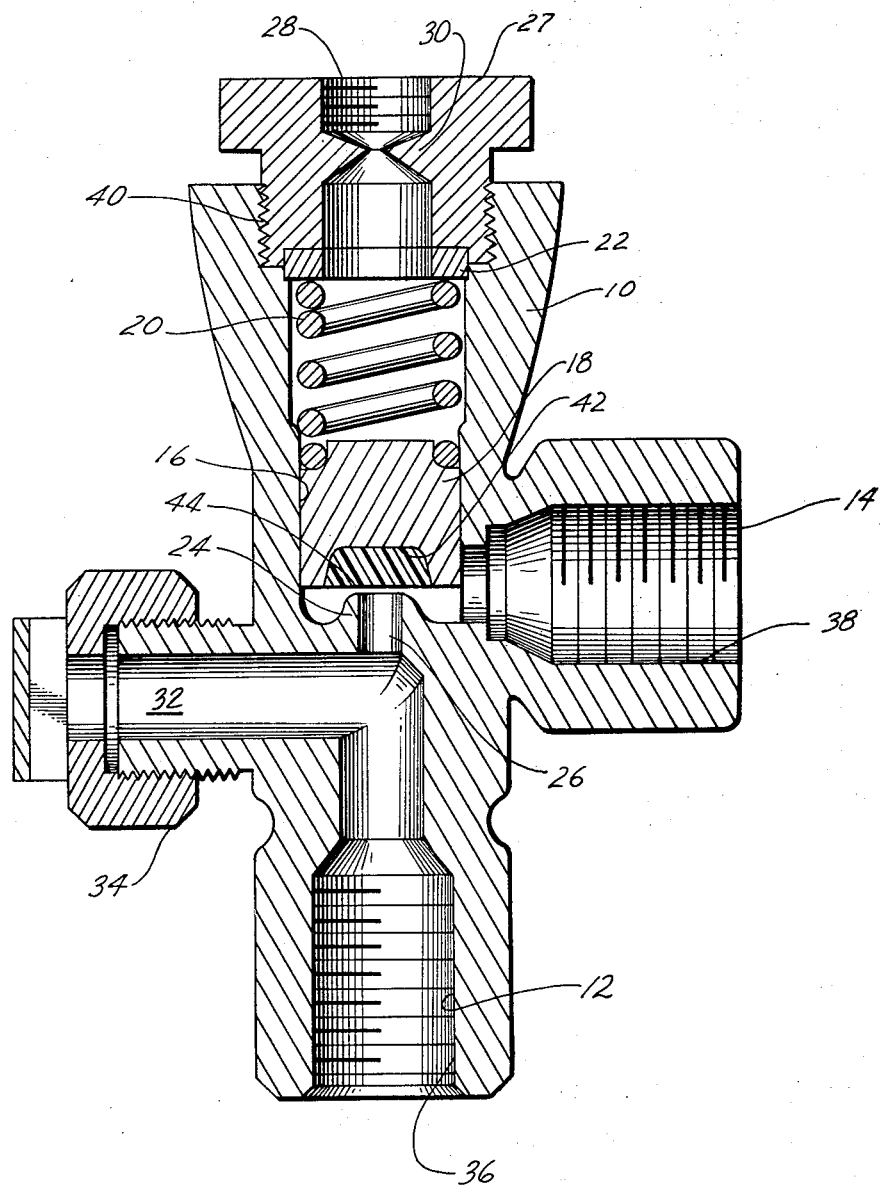
INVENTOR.
ROBERT W. McJONES
BY
Christie, Parker & Hale
ATTORNEYS

FILL LIMITER, CHECK AND SAFETY VALVE

BACKGROUND OF THE INVENTION

The present invention relates to valves in general and, more in particular, to a unitary fill limiter, check and safety valve which prevents back flow from a delivery point to a source of gas while limiting the pressure which can be reached at the delivery point.

Charging systems for gaseous fluids such as natural gas typically utilize a gas compressor for compressing gas for charging tanks to a predetermined pressure of, say, 2265 p.s.i. at 70° F. Charging systems such as this have safety devices for preventing overcharging of the tanks. These safety devices are typically provided in the form of burst discs. Gauges are used to determine tank pressure. Sometimes there are limiter valves which also prevent overcharging of tanks by the compressor.

Heretofore the safety, gauging and limiter components of a charging system have all been separated which has necessitated a considerable amount of piping and labor to incorporate them into a system, and which introduces the possibility of erroneous connection of the various elements.

SUMMARY OF THE INVENTION

The present invention provides a unitary fill limiter, check and safety valve which is extremely economical, easy to install and very reliable in service.

In one form, the present invention contemplates a valve having a body with an inlet passage, an outlet passage and a spring-biased valving element to prevent communication between the two passages. The valving element is disposed in a bore of the body for movement along the bore's axis. The inlet passage opens into the bore through a passage, preferably at an annular valve seat which protrudes into the bore. Preferably, a resilient insert in the valving element is disposed to engage the protruding valve seat to seal off the constricted passage when the valving element is on the seat. Means is provided, such as internal female threads, in each of the inlet and outlet passages to respectively connect them to a source of gas and to delivery tanks. A safety passage opens into the inlet passage and is capped by a standard burst disc assembly. Preferably, the bore in which the valving element resides is closed by a plug or fitting which itself has a passage for communicating the bore with a pressure gauge. The passage in the plug has an orifice to prevent pressure surges downstream of the orifice from affecting the gauge.

A space is defined, between the radial walls of the valving element and the wall of the bore in which the valving element resides, for gas passage from the outlet passage into the bore above the valving element. This gas applies a closing force on the valving element which prevents flow from the outlet passage to the inlet passage in the event that outlet pressure approaches inlet pressure. The force of the spring augments outlet pressure so that when the force of both exceeds inlet pressure the valving element closes.

These and other features, aspects and advantages of the present invention will become more apparent from the following description, appended claims and drawing.

BRIEF DESCRIPTION OF THE DRAWING

The single FIGURE is an elevational, half-sectional view of the presently preferred form for the valve of the present invention.

DESCRIPTION OF THE PREFERRED EMBODIMENT

A body 10 has an inlet passage 12 extending axially a predetermined distance from one of the longitudinal ends of the body. If desired, the inlet passage can extend radially of the axis of the body to a terminus radially past the body's longitudinal axis. An outlet passage 14 extends radially of the longitudinal axis of the body and opens into a bore 16 at a point spaced axially from the inner terminus of the inlet passage.

A valving element 18 is disposed for movement in bore 16 along the longitudinal axis of the body. A spring 20, also disposed in bore 16, acts between a gasket 22 and the valving element to urge the valving element into a closed position against a seat 24 at the end of bore 16 most proximate inlet passage 12. A constricted passage 26 opens into bore 16 from inlet passage 12 through seat 24. The wall of bore 16 and the outer diameter of cylindrical valving element 18 are such as to provide a clearance for gas to pass from outlet passage 14 into the portion of bore 16 above valving element 18, such that the outlet pressure acts axially on the valving element to augment the force of spring 20 in urging the valving element to its seated position.

Bore 16 is closed or capped by a plug or fitting 27 which has an axial passage 28. An orifice 30 in this passage is also provided. Passage 28 can be threaded for coupling the valve to a pressure reading gauge. Orifice 30 prevents pressure surges from affecting gauge reading.

A radially extending safety passage 32 opens into inlet passage 12 at the latter's internal terminus. Safety passage 32 is capped by a standard, unpacked burst disc assembly 34. The burst disc assembly is unpacked to make the assembly sensitive to pressure alone and not to pressure and temperature.

Inlet passage 12 has internal threads 36 for pressure tightly connecting the passage to a source of gas such as a compressor. Similarly, outlet passage 14 has internal threads 38 for pressure tightly connecting the valve to tanks or the like to be charged through it. The threaded section of inlet passage 12 has a diameter which is slightly larger than the balance of the passage and, which is not uncommon in such a case, the two diameter sections are connected through a frusto-conical section. A frusto-conical section also connects the threaded section of outlet passage 14, with a portion of that passage having a diameter less than the threaded section.

Plug 27 is connected to body 10 through threads 40 and bears on gasket 22 to maintain the gasket in position and provide a backing for the gasket against the pressure of spring 20. The plug also slightly compresses the gasket to effect a seal against gas leakage along the threads between the body and the fitting.

Valving element 18 has a recess 42 which receives a resilient element 44 disposed to engage seat 24 and seal against it. Seat 24, as is clear from the illustration, protrudes slightly into bore 16 for this sealing purpose.

In a charging system gas will typically be admitted through inlet passage 12 of body 10 for discharge out of outlet passage 14 into tanks. The pressure at the gas source will far exceed the pressure in the tanks, and as a consequence the force of inlet gas acting on valving element 18 through constricted passage 26 will overcome the counteracting force of outlet pressure acting on top of the valving element and spring 20.

In the event, which is not uncommon, that the compressor is disconnected from the valve and the inlet passage is open to atmosphere, no gas will escape from the tanks because the pressure acting on the top of valving element 18 and the force of spring 20 will maintain the valving element against seat 24.

In the event that inlet pressure exceeds some predetermined amount, burst disc assembly 34 will release to vent the valve. Since the burst disc is on the inlet side of the check valve, rupture of the disc will not permit loss of gas already transferred to the vehicle tanks.

The valve of the present invention cannot be connected in a system erroneously. There are only two connections to be made, the inlet and outlet. If these are mistakenly reversed, no gas can pass through the valve, for inlet pressure would act on the valving element to keep it closed.

Thus the present invention provides a compact integral valve which fulfills a safety function, a fill limiter function and a check valve function.

While the present invention has been described with reference to a preferred embodiment, the spirit and scope of the appended claims should not necessarily be limited to the foregoing detailed description.

What is claimed is:

1. An improved fill limiter, check and safety valve comprising:

a. a body having an inlet passage, means to pressure tightly connect the inlet passage with a source of gas, an outlet passage spaced from the inlet passage, means to pressure tightly connect the outlet passage with tanks to be charged with gas, a bore spaced from the inlet passage and opening into the outlet passage at the end of the bore most proximate the inlet passage, means closing the bore to atmosphere including a plug having a passage therethrough for communicating the bore with a pressure gauge and an orifice in the plug passage for preventing pressure surges from reaching the gauge, a third passage between the inlet passage and the bore, an annular seat around the opening of the third passage into the bore, and a safety passage opening into the inlet passage and to atmosphere;

b. a valving element disposed in the bore for movement along the bore's axis, a space between the valving element and the wall of the bore to communicate the outlet passage and the bore above the valving element for outlet pressure to act on the valving element and urge it against the seat;

c. a spring in the bore acting on the valving element between it and the body to close the valving element on the seat and prevent communication between the inlet and outlet chambers; and d. a burst disc assembly on the body at the end of the safety passage remote from the inlet passage to normally close the safety passage to atmosphere.

2. The improved valve claimed in claim 1 wherein the valving element has a resilient insert for effecting a seal on the seat, the seat being defined by an annular lip.

3. The improved valve claimed in claim 2 wherein the means to pressure tightly connect the outlet passage with tanks to be charged with gas and the means to pressure tightly connect the inlet passage with a source of gas each includes female threads in the wall of the body defining the outlet and inlet passages.

* * * * *